United States Patent [19]

Yoneda

[11] Patent Number: 4,633,989
[45] Date of Patent: Jan. 6, 1987

[54] STRUCTURE FOR SUPPORTING A DIAPHRAGM SPRING IN A CLUTCH

[75] Inventor: Kazuhiko Yoneda, Katano, Japan

[73] Assignee: Kabushiki Kaisha Daikin Seisakusho, Oaska, Japan

[21] Appl. No.: 707,142

[22] Filed: Mar. 1, 1985

[30] Foreign Application Priority Data

Mar. 1, 1984 [JP] Japan .............................. 59-30201[U]

[51] Int. Cl.$^4$ ............................................. F16D 13/44
[52] U.S. Cl. .................. 192/70.27; 192/89 B
[58] Field of Search ............... 192/89 B, 70.27, 30 V; 267/164

[56] References Cited

U.S. PATENT DOCUMENTS

| 2,359,104 | 9/1944 | Geyer | 192/70.27 |
| 3,323,624 | 6/1967 | Maurice | 192/89 B |
| 3,361,239 | 1/1968 | Binder | 192/89 B |
| 3,595,355 | 7/1971 | Maucher et al. | 192/89 B |
| 3,712,436 | 1/1973 | Rist | 192/89 B |
| 3,811,544 | 5/1974 | Maucher | 192/89 B |
| 3,978,955 | 9/1976 | Nagano | 192/89 B |
| 4,114,742 | 9/1978 | Rawlings | 192/89 B |
| 4,241,819 | 12/1980 | Babcock et al. | 192/70.27 |
| 4,562,910 | 1/1986 | Maycock | 192/89 B |

FOREIGN PATENT DOCUMENTS

| 2459921 | 2/1981 | France | 192/89 B |
| 1368245 | 9/1974 | United Kingdom | 192/89 B |

Primary Examiner—Rodney H. Bonck
Attorney, Agent, or Firm—Burns, Doane, Swecker & Mathis

[57] ABSTRACT

A structure for supporting diaphragm spring in a clutch has a pressure plate; a clutch cover covering the rear of the pressure plate; a diaphragm spring disposed between the pressure plate and the clutch cover for forcing the pressure plate and provided with recesses radiately extending from the inner periphery of the spring; support means extending from the inner periphery of the clutch cover through radially outer portions of the recesses; and a pair of wire rings employed as fulcrums for the spring and supported by the support means; at least a part of surfaces of the wire rings being formed by solid lubricant material having a small coefficient of friction and contacting at least one of the clutch cover, the diaphragm spring and the support means.

3 Claims, 5 Drawing Figures

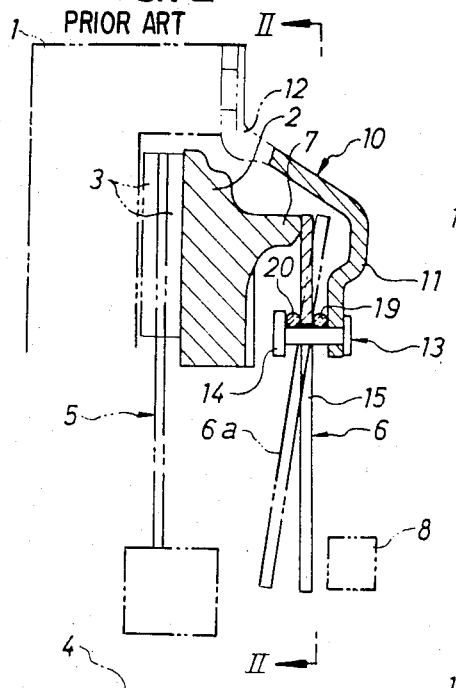

STRUCTURE FOR SUPPORTING A DIAPHRAGM SPRING IN A CLUTCH

BACKGROUND AND SUMMARY OF THE INVENTION

The present invention relates to a structure for supporting a diaphragm spring employed in a friction clutch for an automobile or the like.

A conventional friction clutch basically has a structure as shown in FIG. 1. In FIG. 1, a frictional facing 3 is positioned between a flywheel 1 of an engine and an annular pressure plate 2. The facing 3 is fixed to an outer peripheral portion of a clutch disc 5 connected to an output shaft 4 (only a center line thereof is illustrated). When the pressure plate 2 presses the facing 3 onto the flywheel 1, the clutch engages and a torque is transmitted from the flywheel 1 through the disc 5 to the output shaft 4. A diaphragm spring 6 for forcing the pressure plate 2 toward the facing 3 is disposed at the rear of the pressure plate 2 opposite to the disc 5. The outer peripheral portion of the spring 6 is seated on a projection 7 on the rear surface of the pressure plate 2. When the inner peripheral portion of the spring 6 is pushed by a release bearing 8 toward the disc 5, the spring 6 elastically deforms into a shape shown by phantom line 6a and releases the force against the pressure plate 2, so that the clutch disengages.

The outer periphery and the rear surface of the spring 6 are covered by a clutch cover 10. The clutch cover 10 includes a substantially annular end wall 11 and a cylindrical peripheral wall 12 which inclines and projects from the outer periphery of the end wall 11 toward the flywheel 1 and is fixed at the end thereof to the flywheel 1. Circumferentially spaced axial pins 13 are fixed at their ends to the inner peripheral portion of the wend wall 11. The pins 13 extend from the end wall 11 through recesses 15 of the spring 6 toward the pressure plate 2, and are provided at the other ends with enlarged ends 14 positioning between the pressure plate 2 and the spring 6, respectively.

As shown in FIG. 2, which is a fragmentary schematic sectional view taken along line II—II in FIG. 1, the recesses 15 or slits extend radiately from the inner periphery to the radially middle portion of the spring 6. Thus, the outer peripheral portion of the spring 6 forms a continuous annular portion 16, and the portion radially inside the annular portion 16 is divided by the recesses 15 to form divided lever portions 17. Said pins 13 extend through the radially outer portions of the recesses 15 adjacent to the annular portion 16.

A pair of wire rings 19 and 20 are disposed outside, in the radial direction of the spring 6, of the pins 13. The pins 13 are employed to support the radially inner peripheries of the wire rings 19 and 20. The wire rings 19 and 20 form fulcrums for the spring 6. One wire ring 19 is disposed between the spring 6 and the wall 11. The second wire ring 20 is disposed between the spring 6 and the ends 14 of the pins 13.

In the clutch, sliding occurs at parts pressed between the wire rings 19, 20 and the spring 6, clutch cover 10 and pins 13, when the clutch is operated for engagement and disengagement. However, in the conventional clutch, the wire rings 19 and 20 are made only from steel. Seizure may occur between the parts pressed together. Such seizure increases frictional forces, and thus, a clutch pedal can not be operated smoothly and lightly.

Further, in the conventional clutch, since vibration of the engine transmitted from the flywheel 1 to the clutch cover 10 is directly transmitted through the wire rings 19 and 20 and the spring 6 to the clutch operation mechanism such as the clutch pedal, the driver may feel uncomfortable.

Accordingly, it is an object of the invention to provide an improved structure, overcoming the above-noted problems, in which structures of wire rings for diaphragm spring are improved.

According to the invention, a structure for supporting a diaphragm spring in a clutch comprises a pressure plate; a clutch cover covering the rear of the pressure plate; a diaphragm spring disposed between the pressure plate and the clutch cover for forcing the pressure plate and provided with recesses radiately extending from the inner periphery of the spring; support means extending from the inner periphery of the clutch cover through radially outer portions of the recesses; and a pair of wire rings employed as fulcrums for said spring and supported by said support means; at least a part of surfaces of said wire rings being formed by solid lubricant material having a small coefficient of friction and contacting at least one of the clutch cover, the diaphragm spring and the support means.

Other objects, features and advantages of the invention will appear more fully from the following description of the preferred embodiments of the invention.

BRIEF DESCRIPTION OF THE DRAWINGS

FIG. 1 is a fragmentary schematic sectional view of a conventional clutch;

FIG. 2 is a fragmentary schematic sectional view taken along line II—II in FIG. 1;

FIGS. 3 and 3a are fragmentary schematic sectional views of respectively different embodiments of the invention; and FIG. 4 is a fragmentary schematic sectional view of another type of a clutch employing an embodiment of the invention.

DETAILED DESCRIPTION OF THE PREFERRED EMBODIMENTS

Referring to FIG. 3, which is similar to an enlarged fragmentary view of FIG. 1, parts which are the same as those in FIG. 1 bear the same reference numbers, and will not be descripted in detail hereinafter. In FIG. 3, bodies of a pair of wire rings 19 and 20 are made from steel, similar to the conventional wire rings. As illustrated, either a part of, e.g., half or more, the periphery (FIG. 3) or the full periphery (FIG. 3a) of each wire ring 19, 20 is covered by a tape-like or belt-like member 21, which is made from a solid lubricant material having a very small coefficient of friction. The members 21 are adhered to the full length, in the circumferential direction of a clutch cover 10, of the wire rings 19 and 20 by means of adhesive applied on the surfaces thereof. For example, fluorocarbon resin is impregnated into base material such as glass fiber fabric to form the member 21. In the embodiments of both FIGS. 3 and 3a the wire ring 19 contacts the spring 6, the stems 22 of pins 13 and to the end wall 11 of a clutch cover 10. Similarly, the member 21 affixed onto the wire ring 20 contact the spring 6, the stems 22 and enlarged ends 14 of the pins 13.

One or both of the members 21 may be designed to contact only one of the spring 6 and the stems 22.

When the clutch is operated, the spring 6 deforms while utilizing the wire rings 19 and 20 as the fulcrums. In this operation, sliding occurs on the portions of the wire rings 19 and 20 pressed to the spring 6. However, the sliding occurs not on the surfaces of the steel bodies of the wire rings 19 and 20 but on the surfaces of the solid lubricant members 21 having the small coefficient of friction. Therefore, seizure does not occur on the portions pressed together, and the frictional force is kept small between the portions pressed together. Futher, vibration transmitted from a flywheel to the clutch cover 10 is effectively absorbed by the members 21, because the members have a characteristic frequency different from those of the spring 6, clutch cover 10, pins 13 and other elements. Thus, the vibration is effectively prevented from transmission to the spring 6.

According to the invention, as stated hereinbefore, since the surfaces of the wire springs 19 and 20 contacting the spring 6 are formed by the solid lubricant material having the small coefficient of friction, seizure is prevented between the wire rings 19 and 20, and the spring 6 so that the spring can always operate smoothly. Therefore, the clutch pedal can always be operated smoothly and with a light force. Further, resonant vibration between the clutch cover 10 and the spring 6 can be prevented, and thus, the vibration is not transmitted to the clutch pedal and other parts of the operating mechanism.

Instead of the belt-like members 21, solid lubricant material having a small coefficient of friction may be provided by chemical, flame or other coating on the surfaces of the wire rings 19 and 20 to form the members 21. The whole wire rings 19 and 20 may be made from hard plastics. Members having a small coefficient of friction similar to the members 21 may be interposed between the edges of the recesses 15 and the pins 13. The present invention may be employed in a clutch cover assembly, shown in FIG. 4, wherein the wire rings are supported not by the pins 13 in FIG. 3 but by bent projections integrally formed with the cover 10. The members 21 may be made from Teflon or the like.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed;

What is claimed is:

1. A structure for supporting a diaphragm spring in a clutch comprising a pressure plate; a clutch cover covering the rear of the pressure plate; a diaphragm spring disposed between the pressure plate and the clutch cover for forcing the pressure plate and provided with recesses radiately extending from the inner periphery of the spring; support means extending from the inner periphery of the clutch cover through radially outer portions of the recesses; and a pair of wire rings employed as fulcrums for said spring and supported by said support means; at least a part of the surface of each wire ring being formed by a solid lubricant material having a small coefficient of friction compared to steel and contacting at least one of the clutch cover, the diaphragm spring and the support means, wherein the solid lubricant material includes a tape-like member made from organic or inorganic material, and the tape-like member is affixed to one of the wire rings.

2. A structure for supporting a diaphragm spring in a clutch of claim 1 wherein said solid lubricant material is provided to contact all of the clutch cover, the diaphragm spring and the support means.

3. A structure for supporting a diaphragm spring in a clutch of claim 1 wherein said solid lubricant material has a characteristic frequency different from thoe of the clutch cover, the diaphragm spring and the support means.

* * * * *